United States Patent [19]

Barakat

[11] Patent Number: 4,910,774

[45] Date of Patent: Mar. 20, 1990

[54] METHOD AND SYSTEM FOR SUTHENTICATING ELECTRONIC MEMORY CARDS

[75] Inventor: Simon Barakat, Andresy, France

[73] Assignee: Schlumberger Industries, Montrouge, France

[21] Appl. No.: 216,644

[22] Filed: Jul. 8, 1988

[30] Foreign Application Priority Data

Jul. 10, 1987 [FR] France .................. 87 09794

[51] Int. Cl.$^4$ .............................................. H04K 1/00
[52] U.S. Cl. ........................................ 380/23; 380/24; 380/30; 235/380
[58] Field of Search ..................... 380/23–25, 380/30, 49, 50, 52; 235/380

[56] References Cited

U.S. PATENT DOCUMENTS

| | | | |
|---|---|---|---|
| 4,204,113 | 5/1980 | Giraud et al. ............... | 235/380 X |
| 4,206,315 | 6/1980 | Matyas et al. .............. | 380/23 |
| 4,211,919 | 7/1980 | Ugon ........................... | 380/23 X |
| 4,295,041 | 10/1981 | Ugon ........................... | 380/23 X |
| 4,388,524 | 6/1983 | Walton ........................ | 235/380 |
| 4,405,829 | 12/1977 | Rivest et al. ................ | 380/30 |
| 4,471,216 | 10/1980 | Herve ......................... | 235/380 |
| 4,572,946 | 2/1986 | Schrenk ....................... | 235/380 |
| 4,575,621 | 3/1986 | Dreifus ......................... | 235/380 |
| 4,625,102 | 6/1984 | Rebjock et al. .............. | 235/492 |
| 4,667,088 | 5/1987 | Kramer et al. ............... | 235/380 |
| 4,675,516 | 10/1984 | Guion .......................... | 235/441 |
| 4,697,072 | 9/1987 | Kawana ....................... | 235/380 |
| 4,705,211 | 11/1987 | Honda et al. ................ | 235/380 |
| 4,734,568 | 3/1988 | Watanabe ..................... | 235/380 X |
| 4,748,320 | 5/1988 | Yorimoto et al. ............. | 235/380 X |
| 4,748,668 | 5/1988 | Shamir et al. ................ | 380/30 |
| 4,749,982 | 6/1988 | Rikuna et al. ................ | 235/380 X |
| 4,758,718 | 7/1988 | Fujisaki et al. ............... | 235/380 X |
| 4,766,294 | 8/1988 | Nara et al. ................... | 235/380 |
| 4,777,355 | 10/1988 | Takahira ...................... | 235/380 |
| 4,797,543 | 1/1989 | Watanabe ..................... | 235/380 X |
| 4,816,655 | 3/1989 | Musyck et al. ............... | 235/380 |

Primary Examiner—Stephen C. Buczinski
Assistant Examiner—Bernarr Earl Gregory
Attorney, Agent, or Firm—Sanford J. Asman

[57] ABSTRACT

The method in suitable for authenticating electronic memory cards intended for authorizing the supply of goods or services after being processed by a card reader machine. The card memory includes at least three zones ($Z_1$, $Z_2$, $Z_3$) comprising a first zone ($Z_1$) which is readable from outside and which contains information (I) and a corresponding signature (S) obtained by means of secret data (D) recorded in the third zone ($A_3$) which cannot be read from outside the card. The second zone ($Z_2$) which can be read from outside the card contains the result of secret key and public key encoding all of the data contained in the first zone. This method provides effective protection against several types of fraud.

8 Claims, 2 Drawing Sheets

METHOD AND SYSTEM FOR SUTHENTICATING ELECTRONIC MEMORY CARDS

The present invention relates to a method of authenticating electronic memory cards and to a system for implementing said method.

BACKGROUND OF THE INVENTION

More precisely, the invention relates to a method and a system in which an electronic memory card is delivered by a service-supplying organization to a user to enable the user to receive the services (within limits fixed in advance) by inserting the card into machines for providing said services, each of said machines including a device for transferring information between the circuits of the card and the device itself and for processing said information in order to authorize or deny the supply of the service.

Obviously, the card must include information in its memory suitable for verifying that the card is indeed suitable for obtaining the supply of the services desired and/or that the user is indeed entitled to use the card for the service. In other words, it is necessary for the card and possibly the transfer device in the service-providing machine to include information enabling a card to be authenticated.

The simplest authentication system consists in providing a zone in the card memory which can be read from but which cannot be written to and which includes one or more items of card authentication data.

The drawback of such a card lies in the fact that it is possible to dishonestly copy the authentication data into a blank card, thereby obtaining a card having the same capabilities as an "authentic" card.

In order to make the authentication procedure more secure, U.S. Pat. No. 4,471,216 proposes basing authentication on secret information stored in a manner which is inaccessible from the outside both in the card and in the processing machine. Both the card and the machine include calculating means capable of implementing a common algorithm which makes use of the secret information. If implementing the algorithm both in the card and in the machine gives rise to identical results, then the card is considered as being authentic.

The drawback with such a system is that the secret information must be stored in machines for processing cards. As a result, once a dishonest person has discovered the secret information common to all of the cards, it becomes possible to convert as many blank cards as desired into "authentic" cards.

An object of the invention is to provide a method and a system for authenticating electronic memory cards and serving to improve authentication security.

SUMMARY OF THE INVENTION

The present invention provides a method of authenticating electronic memory cards for insertion into processor machines by users in order to obtain goods or services providing the card is authentic, the method comprising the following stages:

(a) within the memory of said card, first and second zones are defined which can be read freely and which are write protected, and a third memory zone is defined which is write protected and which cannot be read from outside the card;

(b) prior to delivering the card to a user, first information is written in said first memory zone, and secret data is written in said third zone; a signature of said first information is generated by implementing a first, non-secret algorithm that makes use of said secret data, and said signature is written in said first memory zone, said signature and said first information together constituting second information, and said second information is encoded by implementing a second algorithm of the public key and secret key type, and the encoded version of said second information is written in said second zone, thereby constituting third information; and (c) when the user inserts the card in a processor machine, said public key is used to decode said third information which is compared with said second information; then if the decoded third information corresponds to the second information, said secret data is used within said card for calculating the signature of said first information by implementing said first algorithm, and said calculated signature is compared with said signature in said first memory zone.

The present invention also provides a system for authenticating electronic memory cards, the system comprising at least one electronic memory card and at least one processor machine into which said card may be inserted, and including means for interchanging information between said machine and said card, wherein:

said card includes:

a first memory zone which can be read freely and which is write protected, and which stores first information together with a signature which together form second information;

a second memory zone which can be read freely and which is write protected and which stores third information, said third information resulting from encoding said second information by means of a second public key and secret key algorithm;

a third memory zone which cannot be read from outside the card and which is write protected, and which stores secret data; and processor circuits for processing the information contained in said memory zones and information coming from said processor machine;

and wherein said processor machine includes:

means for processing information and means for storing information; and said system further includes means for calculating the signature of said first information on the basis of the secret data by implementing a first algorithm; means for decoding said third information by means of said public key; first means for comparing said third decoded information with said second information; means responsive to said first comparator means for calculating the signature of said first information by means of said secret data by implementing a first public algorithm; and second comparison means for comparing said calculated signature with the signature stored in said first memory zone.

Preferably, said public key and the means for implementing said public key and secret key code are stored in said processor machine, and said means for implementing said first algorithm are stored in the card.

It will thus be understood that neither the secret key of the secret key and public key code, nor the secret data associated with the first algorithm are accessible to a dishonest person since the secret key is used solely by the supplier of services when the card is initialized and the secret data item(s) as stored in the card is/are read protected.

Further, it is not possible to duplicate all of the information contained in the memory since the third memory zone is inaccessible for reading from outside the card. In this situation, if a dishonest person copies the information contained in the first two memory zones into a blank card and then inserts secret data at random in the third zone of the memory, the signature calculation will be erroneous when the card is used.

Further, since the dishonest person does not know the secret data of the algorithm, it is not possible to copy the first information from the first memory zone while randomly inserting a secret data item in the third zone and calculating the signature from the randomly inserted secret data item, since it is not possible to generate the corresponding information in the second memory zone without knowing the secret key of the public key and the secret key code.

In practice, the only option available to a dishonest person is to know the secret data item for a given card.

It will be understood that this can easily be avoided by writing the secret data item into the third memory zone directly from a random number generator, or even by providing two or more secret data items which are obtained separately from distinct random number generators.

BRIEF DESCRIPTION OF THE DRAWING

An implementation of the invention is described by way of example with reference to the accompanying drawing, in which.

DESCRIPTION OF PREFERRED EMBODIMENT

A preferred embodiment of the invention is described with reference to FIGS. 1, 2, and 3.

The system of the invention is essentially constituted by electronic memory cards such as 2 and card processor machines such as 4.

Electronic memory cards are well known. They comprise a body of plastic material provided with external contact tabs (referenced 6 in FIG. 1) in one face. The contact tabs 6 are electronically connected to an electronic circuit 7 formed in a semiconductor chip embedded in the body of the card. U.S. Pat. No. 4,625,102 describes the structure of such a card.

Figure 1:
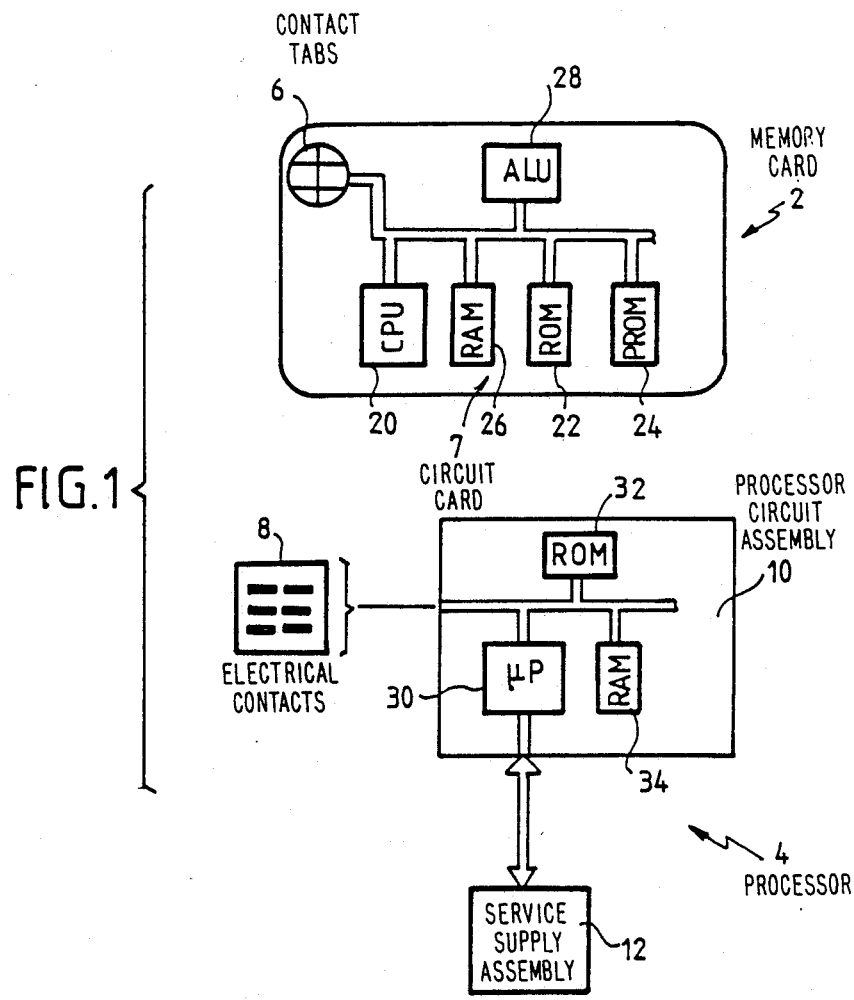
FIG. 1 is a diagram showing an authentication system including a processor machine and a memory card.

The card processor machine 4 comprises a card reader represented diagrammatically in FIG. 1 by electrical contacts 8, a processor circuit assembly 10, and a goods or services supply assembly 12 under the control of the processor circuits 10. The card reader portion of the machine is well known. One such reader is described, for example, in U.S. Pat. No. 4,675,516. In order to describe the present invention, it suffices to recall that when the card 2 is inserted in the reader 8, the contact tabs 6 of the card are electrically connected to the electrical contacts of the reader 8. This makes it possible for the processor circuits 10 of the processor machine 4 to interchange information with the electronic circuit 7 of the card 2. The electrical connection between the reader 8 and the card 2 generally also serves to feed power to the circuit 7 in the card, and optionally to apply a memory-writing voltage to the card.

A complete system for supplying goods or services naturally includes a plurality of processor machines 4 which are all substantially identical, together with a plurality of electronic memory cards 2 with each card being held by a user who desires to obtain the goods or services supplied by the system.

The electronic circuits 7 of the card are well known per se. The card is a so-called "microprocessor" card. The circuits 7 essentially comprise a processor unit 20 or CPU, a program read only memory 22, a non-volatile programmable memory 24, e.g. a programmable read only memory (PROM) or an erasable programmable read only memory (EPROM), a working memory 26 such as a random access memory (RAM), and an arithmetic and logic unit (ALU) 28. This organization is well known, per se, and the following description relates merely to the way it operates.

The processor circuits 10 of the machine 4 for supplying goods or services are connected to the reader 8 and essentially comprise: a microprocessor 30, one or more program memories 32 constituted, for example, by ROMs, and a working memory 34 constituted, for example, by a RAM.

Figure 2:
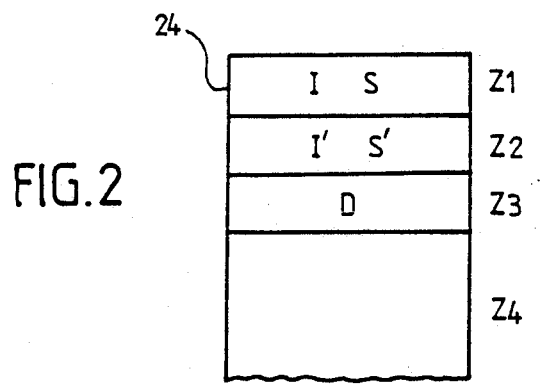
FIG. 2 is a diagram showing the organization of the programmable memory of a memory card.
Figure 3:
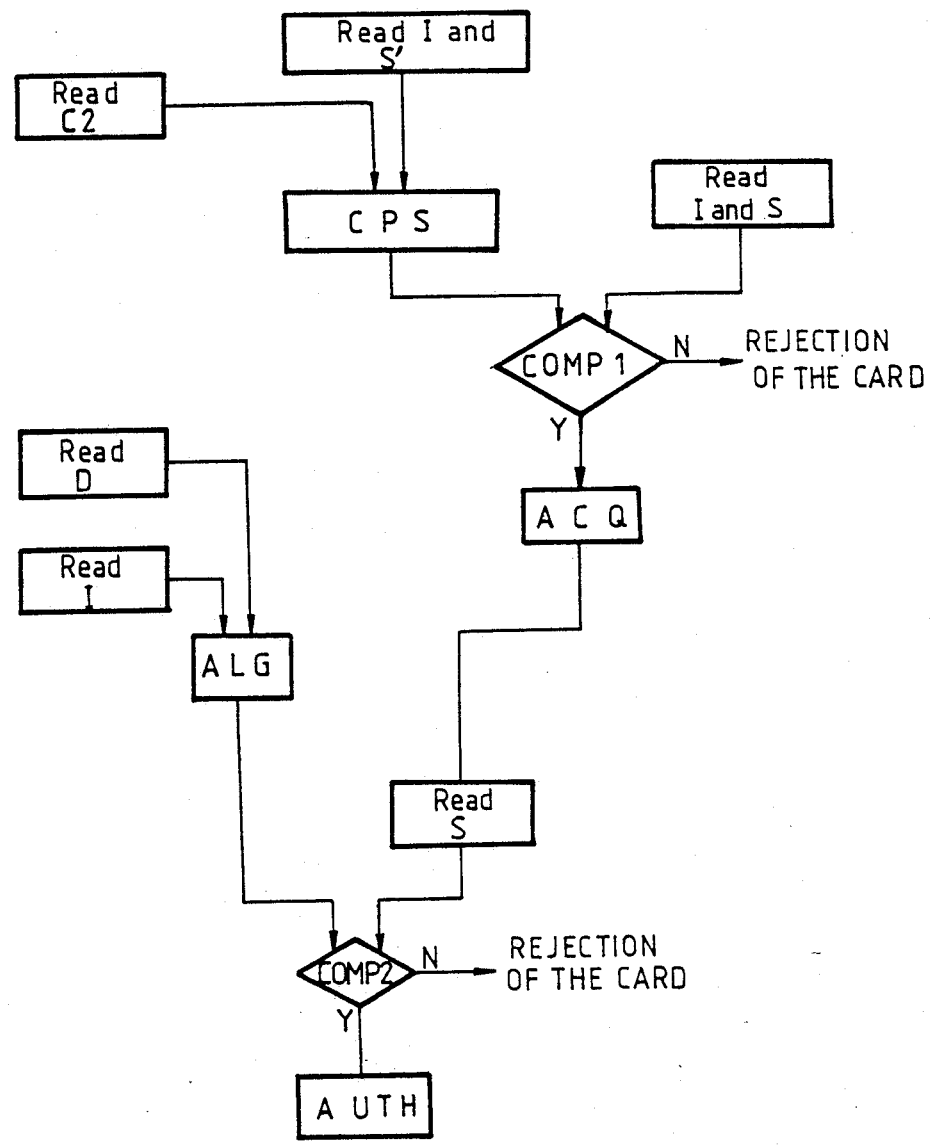
FIG. 3 is a flow chart showing the operation of the authentication system in accordance with the invention.

Reference is now made to FIG. 2 for describing the organization of the non-volatile programmable memory 24 of the card 2. The memory 24 comprises three specialized zones $Z_1$, $Z_2$, and $Z_3$, and a zone $Z_4$ serving, for example, for receiving successive credit balances of the card after it has been used on successive occasions for obtaining goods or services. The term memory zone $Z_1$, $Z_2$, and $Z_3$ covers not only physically distinct and identified zones of the memory, but also the files provided in said memory and used by the card CPU 20.

Before describing the operating details of the system for supplying goods and services in accordance with the invention, its principles of operations are described.

The use of each card in the system comprises a card initialization stage, and subsequent successive normal card utilization stages.

During the initialization stage, the organization which issues cards to users proceeds by recording certain information in the memory zones $Z_1$ to $Z_3$ of the memory 24 in each card. In a first stage, one or more secret data items D are written in the zone $Z_3$ of the memory, and non-secret first information I is written in the zone $Z_1$. The information I must be readable by the processor machine and is constituted, for example, by the information required to enable the processor machines to recognize the card. For example, this information may comprise a serial number, the type of goods or services to which the card has access, limit dates on validity, etc. The secret data item(s) D may be written by the card manufacturer using one or more random number generators. As a result, nobody can find out the value(s) of the secret data D written in the zone $Z_3$.

Thereafter, the zone $Z_3$ is write protected, and cannot be read from outside the card. In a second card initialization stage, a signature S of the first information I contained in memory zone $Z_1$ is calculated by implementing a first non-secret algorithm ALG. The Algorithm ALG makes use of the secret data item(s). Consequently, it is impossible or substantially impossible to calculate the signature S of the information I without knowing the secret data D. The signature S is then also written into the zone $Z_1$ which is then write protected, but remains free to be read.

The third initialization stage uses a public key and secret key encoding algorithm. This type of algorithm is well known, per se. The best known such algorithm is the RSA code which is described, for example, in French patent application number 82 20051, published June 1, 1984. For the purposes of describing the present invention, it suffices to say that information is encoded using a secret key $C_1$ but is decoded using a public key $C_2$. In other words, it is always possible to decode information, but it is impossible to encode said information without knowing the secret key $C_1$. During the third stage, the organization which issues cards uses the secret key $C_1$ of the card in a secret key and public key encoding procedure to encode the first information I and the signature S contained in memory zone $Z_1$, and the corresponding encoded information I' and S', also referred to as "third" information is written in the second memory zone $Z_2$. The zone $Z_2$ is then write protected, but it remains free for reading purposes.

The card is thus initialized and it may be handed over to a user for use in obtaining goods or services. In its first write protected memory zone $Z_1$ it includes second information constituted by the first information I and by the signature S. Its second memory zone $Z_2$, which is also write protected, contains the third information S' and I' obtained by public key and secret key encoding the second information. Finally, the third memory zone $Z_3$ which is both write protected and protected against being read from outside the card contains the secret data D.

When a user seeks to obtain goods or services, the card is inserted in a processor machine. The machine reads the third information S' and I' contained in the zone $Z_2$ of the card memory, and by means of the public key $C_2$, it decodes this information. The decoded information is compared with the information contained in memory zone $Z_1$. If these two sets of information correspond, then the first authentication condition is satisfied. Thereafter, the signature S' of the information I in the memory zone $Z_1$ is calculated within the card itself by implementing the algorithm ALG and making use of the secret data D stored in memory zone $Z_3$. If the calculated signature S' and the signature S stored in zone $Z_1$ correspond, then the card is considered as being authentic and the user can obtain the desired goods or services.

The authentication system in accordance with the invention is described in greater detail with reference, more particularly, to FIGS. 1 and 3.

Returning to FIG. 1, and more precisely to the program memory 22 in the card, it includes a subprogram ALGP for authentication purposes which implements the non-secret algorithm ALG. The subprogram ALGP contains the parameters of the algorithm, the calculation instructions implemented by the CPU 20, the ALU 28, and the working memory 26, and also instructions for reading the secret data D stored in the zone $Z_3$ of the memory 24. The memory 22 also contains a subprogram PROT which is used, under the control of the CPU, to control access conditions to the memory zones $Z_1$, $Z_2$, and $Z_3$. It is this subprogram which is known per se, which authorizes writing in the zones $Z_1$, $Z_2$, and $Z_3$ during the initialization stage and which subsequently prevents writing in said zones. The subprogram PROT also prevents memory zone $Z_3$ being read from outside.

If, in addition, the memory 24 is electrically erasable, then the memory zones $Z_1$, $Z_2$, and $Z_3$ may additionally be erase protected. This may be obtained, for example, by changing the subprogram PROT.

With reference to the program memory 32 of the processor machine 4, this also contains a number of subprograms or data. It contains the public key $C_2$ of the algorithm for public key and secret key encoding, the subprogram CPS for performing public key and secret key encoding, a first comparison subprogram COMP1, and a second comparison subprogram COMP2. The subprogram CPS includes instructions for reading the third information from memory zone $Z_2$, instructions for implementing the public key and secret key algorithm per se, and instructions for reading the public key $C_2$. The subprogram COMP1 controls reading the second information I and S contained in memory zone $Z_1$, comparing the information I and S with the information decoded by the subprogram CPS, and generating an acknowledge instruction ACQ if the two sets of information are identical or, more generally, if they correspond. The subprogram COMP2 is run by the acknowledge instruction ACQ and it includes instructions for reading the value of the signature in the card as calculated by implementing the subprogram ALGP, for reading the signature S in the zone $Z_1$, and for comparing the information as read from two different locations in the card, and finally an instruction AUT which is delivered if the two values are identical, or more generally if they correspond.

The operation of the system when a user seeks to obtain goods or services is now described in greater detail.

When the user inserts the card 2 in the reader 8 of the machine, the subprogram CPS stored in the memory 32 is run. The processor circuit 7 reads the third information from the zone $Z_2$ and also reads the public key $C_2$ and then decodes the third information. Thereafter the subprogram COMP1 is run. It compares the second information as previously read from memory zone $Z_1$ with the decoded information. If the two sets of information coincide or correspond, an ACQ instruction is generated. Otherwise the card is rejected.

Simultaneously, the subprogram ALGP is implemented in the card by the CPU 20 and the ALU 28. The first information I and the secret data D are read by this subprogram and the algorithm ALG is applied to the information I. The subprogram ALGP thus calculates a signature S" which is temporarily stored in the memory 26.

If an ACQ instruction has been generated, the subprogram COMP2 stored in the memory 32 is run. The signature S" is read from the memory 26 and the signature S is read from the zone $Z_1$ of the memory 24. The subprogram compares the signature S and S". If they coincide, or more generally if they correspond, then the circuit 7 of the processor machine 4 generates an authentication signal AUT. If this occurs, the user can obtain the desired goods or services under the usual conditions. Otherwise the card is rejected.

It follows from the above detailed description that the above-described degree of security in authentication is indeed obtained even if the dishonest person succeeds in gaining access to the information or the instructions stored in the circuits of the processor machine.

Further, it is observed that authentication is obtained without the user having to remember a personal identification number. Nevertheless, the authentication system in accordance with the invention could naturally be combined with a procedure for recognizing a personal code which is stored in an inaccessible manner in the card and which is given to the processor machine by the user each time the user seeks to use the card.

I claim:

1. A method of authenticating electronic memory cards for insertion into a processor machine by users in order to obtain goods or services providing the card is authentic, the method comprising the steps of:

(a) limiting external access to the memory of said card, first and second zones being defined which can be read freely and which are write protected, and a third memory zone defined which is write protected and which cannot be read externally from the card;

(b) prior to delivering the card to a user, writing first user identification information in said first memory zone, and writing encryption key data in said third zone; encrypting said first user identification information to form signature data by implementing a first encryption algorithm using the encryption key data, and writing said signature data in said first memory zone, said signature data and said first information together constituting second information, and encoding said information using a second encryption key by implementing a second encryption algorithm of the public key and secret key type, and writing an encrypted version of said second information in said second zone, thereby constituting third information; and (c) when the user inserts the card in a processor machine, a public decryption key using said processor machine to decode said third information and comparing said decoded third information with said second information; then if the decoded third information corresponds to the second information, using said first encryption key data within said card for calculating signature data of said first information by implementing said first encryption algorithm, and compare and calculated signature data with said signature data stored in said first memory zone thereby authenticating the card.

2. A system for authenticating electronic memory cards, the system comprising at least one electronic memory card and at least one processor machine into which said card may be inserted, and including means for interchanging information between said machine and said card, wherein;

said card includes:

a first memory zone which can be read freely and which is write protected, and which stores first information together with encrypted signature data which together form second information;

a second memory zone which can be read freely and which is write protected and which stores third information, said third information resulting from encoding said second information by means of a second public key and secret key algorithm using a user encryption key;

a third memory zone which cannot be read externally from the card and which is write protected, and which stores encryption key data; and processor circuits for processing the information contained in said first and second memory zones and information coming from said processor machine;

and wherein said processor machine has processing means for processing information and data storage means for storing information; and said system further includes means contained on said card for calculating signature data of said first information on the basis of the encryption key data by implementing a first encryption algorithm on said card; means for decoding said third information by means of a public decryption key to form third decoded information; first comparator means for comparing said third decoded information with said second information; means responsive to said first comparator means for calculating signature data of said first information by means of said encryption key data by implementing a first public encryption algorithm using said encryption key data; and second comparison means for comparing said calculated signature data with the signature data stored in said first memory zone and, in response thereto, authenticating said card.

3. A system according to claim 2, wherein said public key and the means for implementing said public key and secret key code are stored in said processor machine, and wherein said means for implementing said first algorithm are stored in the card.

4. A system according to claim 3, wherein said first and second comparison means are disposed in the processor machine.

5. A system according to claim 4, wherein said public key and secret key is an RSA code.

6. A system according to claim 2, wherein said first and second comparison means are disposed in the processor machine.

7. A system according to claim 6, wherein said public key and secret key code is an RSA code.

8. A system for authenticating electronic memory cards comprising: a memory card including (a) a first memory area readable by an external device for storing card identification data and signature data comprising said card identification data encrypted using a first encyption key and algorithm, (b) a second memory area readable by an external device for storing verification data comprising said signature data encrypted using an RSA code and a second encryption key, (c) a third memory area not readable external to the card for storing said first encyption key, and (d) processor means having read access to said first, second and third memory areas, ecryption means for encrypting said card identification data to form signature data and comparison means for comparing said signature data with signature data previously stored in said first memory area and producing a first comparison signal responsive thereto; and an access control processor including (a) means for decoding said verification data stored in said second memory area to form decrypted signature data, (b) means for comparing said decrypted signature data with said signature data stored in said first memory area and, in response, producing a second comparison signal, and (c) means for responsive to said first and second comparison signals for producing an authentication signal.

* * * * *